United States Patent
Stair et al.

(10) Patent No.: US 10,323,628 B2
(45) Date of Patent: Jun. 18, 2019

(54) FREE PISTON LINEAR MOTOR COMPRESSOR AND ASSOCIATED SYSTEMS OF OPERATION

(71) Applicants: Jason Stair, Chicago, IL (US); Anthony Lindsay, Geneva, IL (US); Michael Lewis, Austin, TX (US); Raymond Zowarka, Austin, TX (US); Siddharth Pratap, Austin, TX (US); Clay Hearn, Austin, TX (US); Charles Penney, Round Rock, TX (US); Michael Worthington, Spicewood, TX (US); Hsing-Pang Liu, Austin, TX (US)

(72) Inventors: Jason Stair, Chicago, IL (US); Anthony Lindsay, Geneva, IL (US); Michael Lewis, Austin, TX (US); Raymond Zowarka, Austin, TX (US); Siddharth Pratap, Austin, TX (US); Clay Hearn, Austin, TX (US); Charles Penney, Round Rock, TX (US); Michael Worthington, Spicewood, TX (US); Hsing-Pang Liu, Austin, TX (US)

(73) Assignees: GAS TECHNOLOGY INSTITUTE, Des Plaines, IL (US); BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 348 days.

(21) Appl. No.: 14/536,174

(22) Filed: Nov. 7, 2014

(65) Prior Publication Data
US 2015/0125323 A1   May 7, 2015

Related U.S. Application Data

(60) Provisional application No. 61/901,176, filed on Nov. 7, 2013.

(51) Int. Cl.
*H02K 33/12* (2006.01)
*F04B 17/04* (2006.01)
(Continued)

(52) U.S. Cl.
CPC .......... *F04B 19/003* (2013.01); *F04B 17/042* (2013.01); *F04B 25/02* (2013.01);
(Continued)

(58) Field of Classification Search
CPC ...... F04B 35/045; F04B 25/02; F04B 39/005; F04B 17/04; F04B 17/046; F25B 1/10;
(Continued)

(56) References Cited

U.S. PATENT DOCUMENTS

| 3,937,600 A | 2/1976 | White |
| 4,345,442 A | 8/1982 | Dorman |

(Continued)

FOREIGN PATENT DOCUMENTS

| DE | 834 125 | 3/1952 | |
| EP | 0106414 A2 * | 4/1984 | ............ F04B 35/045 |

(Continued)

OTHER PUBLICATIONS

U.S. Patent Office, English language version of the International Search Report, Form PCT/ISA/210 for International Application PCT/US2018/56103, dated Dec. 21, 2018 (3 pages).

(Continued)

*Primary Examiner* — Nathan C Zollinger
(74) *Attorney, Agent, or Firm* — Pauley Erickson & Kottis

(57) ABSTRACT

A linear motor compressor including a compressor housing and a cylinder housing having a plurality of opposing compression chambers. A piston freely reciprocates within the cylinder housing using a linear electric motor.

22 Claims, 3 Drawing Sheets

(51) Int. Cl.
*F04B 19/00* (2006.01)
*F04B 25/02* (2006.01)
*F04B 31/00* (2006.01)
*F04B 35/04* (2006.01)
*H02K 33/16* (2006.01)

(52) U.S. Cl.
CPC ............ *F04B 31/00* (2013.01); *F04B 35/045* (2013.01); *H02K 33/12* (2013.01); *H02K 33/16* (2013.01)

(58) Field of Classification Search
CPC ........ H02K 33/00; H02K 33/12; H02K 33/14; H02K 33/16; H02K 33/18
USPC .......................................................... 417/417
See application file for complete search history.

(56) References Cited

U.S. PATENT DOCUMENTS

| | | | | |
|---|---|---|---|---|
| 4,750,871 | A * | 6/1988 | Curwen | F04B 35/045 417/320 |
| 5,261,799 | A * | 11/1993 | Laskaris | H02K 33/18 310/15 |
| 5,525,044 | A * | 6/1996 | Chen | F04B 5/02 417/262 |
| 5,772,410 | A | 6/1998 | Chang | |
| 5,809,792 | A | 9/1998 | Song | |
| 5,947,693 | A * | 9/1999 | Yang | F04B 49/06 417/44.11 |
| 6,084,320 | A | 7/2000 | Morita et al. | |
| 6,231,310 | B1 * | 5/2001 | Tojo | F04B 35/045 417/417 |
| 6,499,972 | B2 * | 12/2002 | Yatsuzuka | F04B 35/045 417/416 |
| 6,644,943 | B1 | 11/2003 | Lilie et al. | |
| 7,478,539 | B2 | 1/2009 | Shapiro et al. | |
| 7,663,275 | B2 | 2/2010 | McGill et al. | |
| 8,172,557 | B2 * | 5/2012 | Hilger | F04B 9/042 417/569 |
| 8,707,717 | B2 * | 4/2014 | Fox | F25B 9/14 62/115 |
| 2002/0101125 | A1 * | 8/2002 | Ibuki | H02P 25/032 310/114 |
| 2004/0095028 | A1 | 5/2004 | Shearer et al. | |
| 2006/0201175 | A1 | 9/2006 | Shapiro et al. | |
| 2009/0081049 | A1 | 3/2009 | Tian et al. | |
| 2010/0183450 | A1 * | 7/2010 | Schmidt | F04B 35/045 417/212 |
| 2011/0052430 | A1 * | 3/2011 | Dehnen | F04B 17/044 417/410.1 |
| 2013/0287611 | A1 | 10/2013 | Schmidt | |

FOREIGN PATENT DOCUMENTS

| | | |
|---|---|---|
| EP | 1 582 119 B1 | 10/2005 |
| FR | 1247176 | 11/1960 |
| WO | WO 2017/171816 A1 | 10/2017 |

OTHER PUBLICATIONS

U.S. Patent Office, English language version of the Written Opinion of the International Searching Authority, Form PCT/ISA/237 for International Application PCT/US2018/56103, dated Dec. 21, 2018 (8 pages).

* cited by examiner deregulated as patent content follows:

FREE PISTON LINEAR MOTOR COMPRESSOR AND ASSOCIATED SYSTEMS OF OPERATION

CROSS REFERENCE TO RELATED APPLICATION

This application claims the benefit of U.S. Provisional Patent Application, Ser. No. 61/901,176, filed on 7 Nov. 2013. The Provisional Application is hereby incorporated by reference herein in its entirety and is made a part hereof, including but not limited to those portions which specifically appear hereinafter.

GOVERNMENT RIGHTS

This invention was made with government support under Grant No. DE-AR0000257 awarded by the U.S. Department of Energy. The government has certain rights in the invention.

FIELD OF THE INVENTION

This invention generally relates to a linear motor compressor and associated systems and methods for gas compression operation, i.e., a natural gas vehicle home refueling appliance.

DESCRIPTION OF RELATED ART

There is a rapidly developing need for natural gas vehicle (NGV) refueling stations and similar installments that require safe and cost-effective pressurization, movement and delivery of a process fluid, such as natural gas. Such installments may be used to fill vehicles, dispense process fluid, provide pressure boost stations for gas pipelines, fill energy storage systems or storage tanks, refrigeration and process fluid compression and other needs.

Existing natural gas compressors are largely based on reciprocating compressor technology, in which a rotational electric motor drives a crankshaft in a multi-piston compressor. These units suffer from high manufacturing costs, high mechanical parasitic losses, relatively high maintenance costs, and short operational lifespan between repairs. In addition, existing units are often unsuitable for specialty compressor applications where contamination or leakage of the process fluid is unacceptable. Applications requiring high purity process fluids that are compressed to elevated pressures have limited and costly options.

A need therefore exists for a simple mechanical solution for a compressor station using a minimum of moving parts in a durable and robust configuration that will also satisfy the specialty compressor requirements.

SUMMARY OF THE INVENTION

Accordingly, the subject invention relates to a Free Piston Linear Motor Compressor (FPLMC), which preferably eliminates all but one major moving part and improves durability and compressor system efficiency, while significantly decreasing manufacturing costs, installation, and maintenance of gas compression, which includes but is not limited to natural gas, other hydrocarbons, hydrogen, and air.

This and other objects of the invention are addressed in one aspect of the invention by a system that includes a multi-stage dual-acting free piston driven by a linear motor. The subject arrangement is preferably used in connection with an integrated staged compressor and linear motor to result in, for example, an appliance for natural gas vehicle fueling, particularly direct fill into an unattended vehicle.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

One preferred application of the subject invention relates to refueling of natural gas vehicles. Although described in detail below with respect to NGV refueling stations, the subject invention is not limited to such applications and numerous other suitable applications achieving various pressure levels and producing various flow rates are likewise appropriate for use with the subject invention.

Natural gas refueling in a consumer or home environment is critical to the widespread adoption of natural gas vehicles and presents a unique opportunity for consumers to save significantly on the cost of fuel on a per gallon equivalent advantage over gasoline and diesel and enjoy the convenience of fueling at home. Traditional home refueling appliances (HRAs) have relied on multi-piston reciprocating compressors driven by a rotary electric motor. These systems are complicated, expensive, and have historically suffered poor reliability. The free piston linear motor compressor solves these problems by using a linear motor to drive a single, multi-stage piston, reducing complexity and part count, which improves overall reliability and simplifies manufacturing. Furthermore, efficiency of the linear motor compressor may be improved by operation at a resonant frequency with low friction coatings and reduced clearance volume losses.

To obtain an efficient linear motor design in a compressor application, it should preferably operate at a resonant frequency. This is traditionally accomplished with a mechanical spring in which the mass of the piston and the spring dictate the system's natural, resonant frequency. Heavy duty springs needed for high pressure applications can be bulky and costly, leading to a larger, heavier, and more costly compressor design. Mechanical springs are also often a wear or maintenance item resulting in interruptions in operation of the unit for routine maintenance. Mechanical springs can also be prone to fatigue and catastrophic failure, especially when operated at relatively high frequencies and high temperatures as expected with the natural gas compressor for refueling natural gas vehicles. For at least these reasons, the preferred design preferably does not use mechanical springs, instead utilizing compression chambers as a dual purpose compression chamber and gas spring. This simplifies the design by eliminating all dedicated spring-like components, and simply using the stranded gas remaining in the compression chamber as the spring, allowing for operation at resonance.

Figure 1:
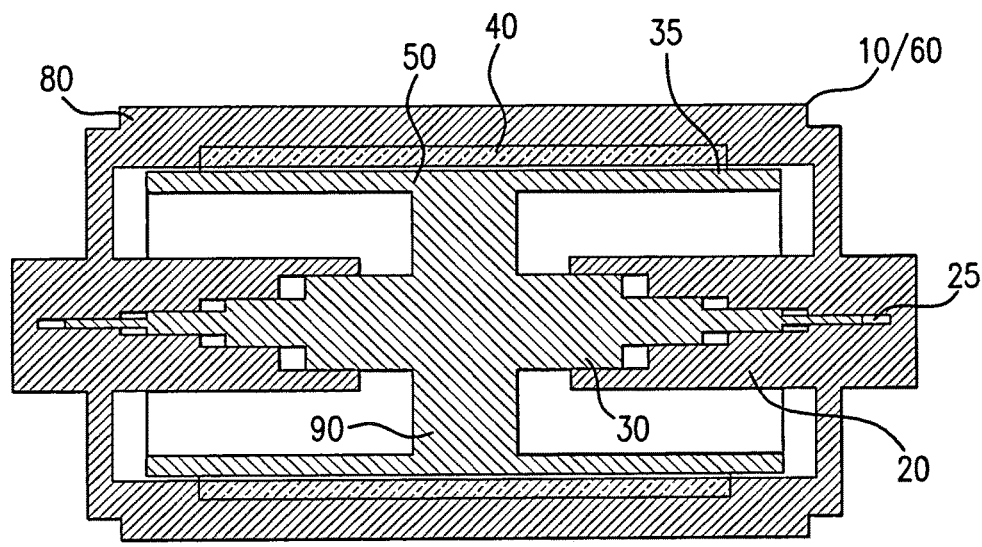
FIG. 1 is a simplified cross-sectional view of a compressor in accordance with one embodiment of the invention.
Figure 2:
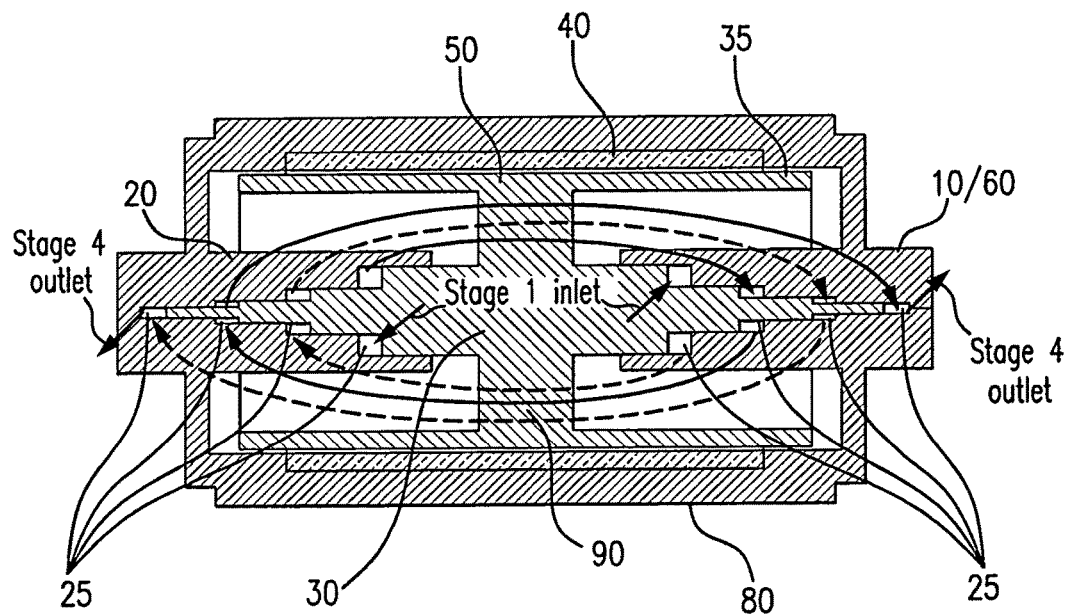
FIG. 2 is a simplified cross-sectional view of the compressor shown in FIG. 1 illustrating dual-acting, four-stage compression circuits.

According to one preferred embodiment, the FPLMC concept, depicted in FIG. 1, includes a symmetric multi-stage dual-acting free piston driven by a linear motor. FIG. 1 shows a four stage unit although other stage increments may be likewise suitable. As shown in FIG. 2, the FPLMC preferably uses compression chambers, in which compression discharge in a lower stage feeds the inlet of the next higher stage. This approach uniquely combines the functions of the compressor and motor into one device with a single moving part, thus eliminating the inefficiencies inherent in converting rotary motion into linear motion. The design results in fewer wearing components, reduced parasitic friction and consequently increased compressor durability, reliability, and reduced maintenance. In addition, the design drastically decreases the overall number of parts, allowing for ease of manufacturing and reduced initial investment. The embodiment shown in FIG. 1, based on analyses discussed below, may comprise an 200 mm (~8 inch) diameter by 400 mm (~16 inch) long device with an estimated mass of 45 kgs (~100 lbs), but may be scaled up or down to achieve a broad range of flow rates and compression ratios.

One preferred compressor design results in four-stages of compression with compression ratios of approximately 4:1 per stage. The design assumes natural gas inlet pressures of 1 bar and has the ability to compress to at least 290 bar. This preferred compressor design operates at 15 Hz resonant frequency and has a natural gas flow rate of 60 liters per minute (~2 standard cubic feet per minute (scfm)). The preferred compressor design is driven by a reciprocating reluctance linear motor operating on 240V, single-phase, 30 A service and capable of providing a 3,000 N compression force.

Thermal management of the linear motor and inter-stage gas are also important as reduced temperatures may further improve the overall compression efficiency of this device. Methods of heat management include forced air or water cooling to integrated heat pipes that use hermetically sealed refrigerants.

A resulting FPLMC making use of a single piston to achieve multiple stages of compression is one preferred component of the subject invention. As a result of the subject invention, a uniquely coupled electromagnetic compressor includes a fully integrated and optimized electric motor and compressor that are no longer independent.

Figure 3:
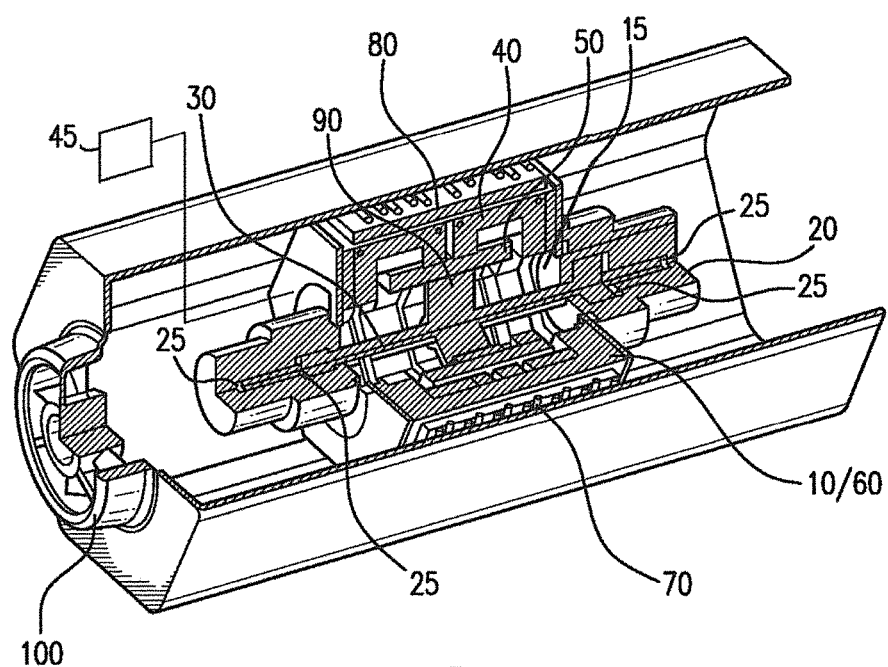
FIG. 3 is a side cross-sectional view of a compressor in accordance with one aspect of the invention.

FIG. 3 shows one preferred embodiment of a free piston compressor that may include one or more of the following components: a compressor housing 10; a multi-stage cylinder housing 20; a compressor piston 30; a motor stator 40; a motor armature 50; a sealed gas flooded housing 60; inter-stage cooling tubes 70; motor cooling fins 80; hub integrating motor and compressor 90; and/or cooling fan 100.

Figure 4:
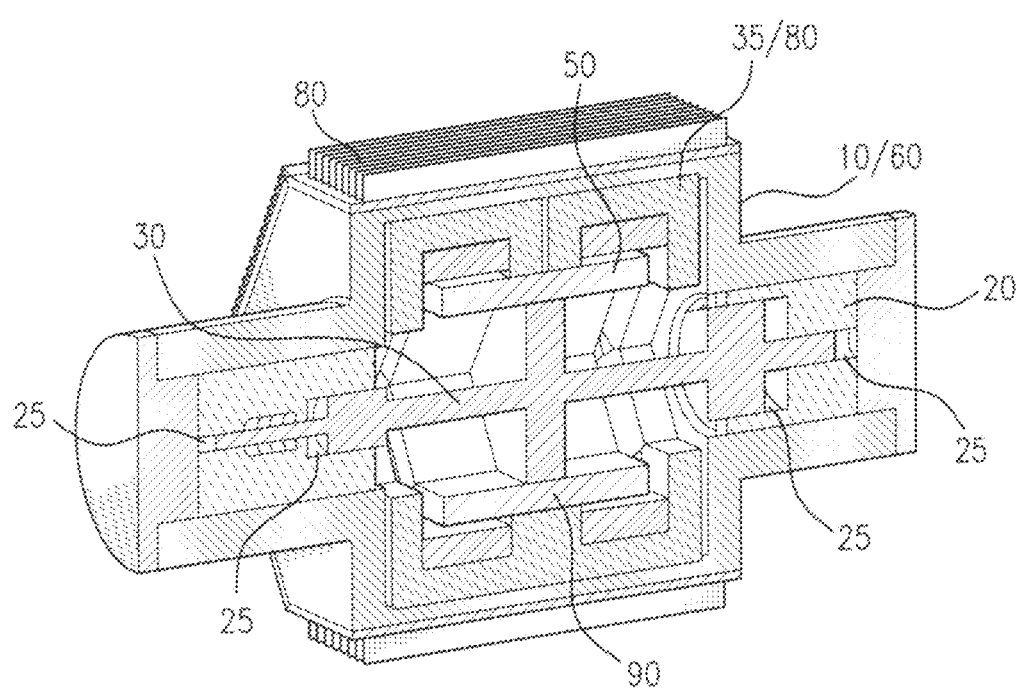
FIG. 4 is a side cross-sectional view of a compressor in accordance with one aspect of the invention.

According to a preferred embodiment of this invention shown in FIG. 4, a linear motor compressor includes a compressor housing 10 having an internal cylinder housing 20 and a plurality of opposing compression chambers 25. The compressor housing 10 and cylinder housing 20 are preferably formed using cast iron alloys, steel alloys, or aluminum alloys using known manufacturing techniques. The opposing compression chambers 25 are preferably arranged opposite each other to facilitate use of a piston arrangement as described in more detail below.

A piston 30 is freely positioned within the cylinder housing 20 to reciprocate freely back and forth or up and down (any orientation is achievable) within the cylinder housing 20 thereby alternatingly charging (pressurizing) opposing compression chambers 25. A preferred arrangement of the piston 30 permits bi-directional drive and free reciprocation within the cylinder housing 20. According to one preferred embodiment, the piston 30 freely reciprocates within the cylinder housing 20 such that compression discharge from an outlet of a chamber of one side of the opposing compression chambers 25 feeds an inlet of another chamber. As described, for maximum efficiency, the piston 30 preferably operates at resonant frequency.

The plurality of opposing compression chambers 25 preferably comprise a series of stepped diameter compression chambers positioned at opposing ends of the cylinder housing 20. Alternatively, the plurality of opposing compression chambers 25 comprise compression chambers of a single diameter at opposing ends of the cylinder housing. The former embodiment may, though not necessarily, be more suited to a plurality of stages while the latter embodiment may be more suited to a single or two stage arrangement.

In this manner, compression is preferably achieved with a single primary moving part. In addition, in a preferred embodiment of this invention, the piston 30 reciprocates without assistance from a mechanical spring. A low friction coating on the piston 30 and/or cylinder housing 20 may be used in combination with a seal material optimized for a process fluid to reduce energy consumption and increase seal life.

In addition, the invention further includes a linear electric motor 35 preferably positioned in-line relative to the compressor housing 10 to reciprocate the piston 30. The linear electric motor 35 may be adapted to the cylinder housing 20 or otherwise positioned in an integrated or non-integrated manner to facilitate efficient reciprocation of the piston 30 within the cylinder housing 20. In one embodiment of this invention, the linear electric motor 35 is directly coupled to the piston 30.

According to one preferred embodiment, the linear motor compressor of the present invention may include a compressor housing 10 and/or a cylinder housing 20 that is pressurized with a process fluid. In addition or alternatively, the compressor housing 10 may include a blowdown volume 15 for depressurizing the compressor and related systems at the conclusion of the compression process. In this manner, the linear motor compressor assembly may be hermetically sealed. By hermetically sealing the compressor chambers 25 and the linear electric motor 35 in the same housing, certain hazards may be avoided when the process fluid is combustible or otherwise volatile. Sealing the relevant components permits operation at high pressures without contamination from outside sources and without risk of combustion due to sparking, arcing or other hazards that may occur depending on the installation.

According to one embodiment, the linear electric motor 35 includes a reluctance motor with dual opposing winding cores. Alternatively, the linear electric motor 35 may comprise a permanent magnet motor, an induction motor, a voice coil motor, a reluctance motor, or an alternative linear motor variant. Further, in one embodiment, the compressor system described herein may include a motor stator fully integrated within the housing. In each case, the preferred linear electric motor 35 will be robust and engineered to endure the high frequency cycles and load volumes expected for applications such as described herein.

The system may additionally be optimized with various further embodiments. For instance, according to one preferred embodiment, an integrated motor and process fluid cooling system may be utilized for heat removal. Integrated motor and interstage gas coolers may use forced air convection and require only one fan or blower.

Also a piston position feedback control system 45 with adaptive current output to minimize energy required to do work may be employed. The preferred embodiment utilizes a linear encoder feedback loop to track the position of the linear motor/piston, allowing the controller to adjust the current up or down in order to maintain an optimized frequency.

A mechanical failsafe (not shown) may be further incorporated into the subject invention, for instance using compliant stator laminations and compressor heads to decelerate the piston during a failure mode. Ideally, in the event of an impact and control system failure, armature motion will automatically be contained in a fail-safe manner, greatly reducing the potential for damage or gas leaks.

According to a preferred embodiment of this invention, the arrangement of components as described may result in the following preferred or unique features/attributes of the invention. It is desirable for the invention to include one or more stages of compression with a single piston. Motive force is preferably supplied with a custom designed linear reluctance motor, although other motor variants such as permanent magnet, induction, and homopolar induction have also been designed.

According to one embodiment of the linear electric motor 35, a reluctance motor may include dual opposing winding cores that provide reciprocating linear motion. A reluctance motor armature, or moving part, has low losses and allows for a sealed motor housing, which can act as a receiver volume for the depressurization of the compressor.

In the preferred embodiment, compression stages are designed such that the differential pressure acting across seals is reduced by placing lower stages next to higher stages such that the pressure of the lower stage is acting on the back of the high pressure stage. This reduces the net force acting on the seal, improving seal life and durability.

Low profile valve design and unique valve locations preferably minimize a volume in the compressor which does not contribute to work. This improves the efficiency and reduces net power required for compression. The compressor cylinders may be manufactured with unique interlocking scheme to allow ease of alignment and service.

The linear motor compressor of the subject invention may further include a directly coupled compressor piston and motor armature. For example, a rigid piston or a flexible coupling may be positioned between the piston and an armature of the linear electric motor. The flexible coupling between compressor piston and motor armature as described preferably allows for independent alignment.

Resonant frequency operation preferably based on mass and dynamic gas spring may be used to increase system efficiency. As described, a dynamic gas spring preferably replaces a mechanical spring in the subject system. Advanced controls allow for operation without mechanical springs.

Advanced controls may further allow for minimal gap/volume at end of compression stroke, thus minimizing volume which does not provide useful work. In addition, such controls may enable position only control, velocity only control, or control with no external sensors (sensorless control) through active inductance measurements of the linear motor coils.

The reluctance motor as described may use laminated polygonal design to reduce cost and ease fabrication and assembly. The segments are preferably laminated in the direction perpendicular to current flow to limit losses and improve controllability. One coil preferably links all polygonal segments eliminating end turns in the individual segments and reducing losses. In addition, the segments preferably lock into a sealed stator housing. As described above, the motor is preferably vacuum pressure impregnated to provide insulation integrity. Alternatively, the reluctance motor may use a circular lamination design with similar design and benefits as described above.

As described, the resulting FPLMC system creates numerous advantages including: (1) reduces friction losses, no rotary to linear motion conversion; (2) reduces part count, uses single piston for multiple stage compression; (3) reduces differential seal pressure, increases seal life; (4) reduces moving parts, reduces maintenance; (5) control algorithm allows removal of mechanical spring typically used in linear motor compressor for resonant frequency operation; (6) reluctance motor design allows for sensorless control, eliminating additional sensors which add to cost and prone to fail; and/or (7) reduces costs and increases overall reliability of gas compressor.

Other potential markets, besides direct natural gas vehicle refueling include: (1) commercial CNG fleets where a low cost compressor could be paired with multiple vehicles for the convenience of unattended fueling; (2) assisting with NGV fast-fill dispensing to complement storage pressure equalization; (3) gas pipeline pressure boost stations; (4) hydrogen vehicles refueling; (5) air compressors for SCBA, SCUBA, and energy storage systems; (6) refrigeration and industrial gas compression; and/or (7) on-board a vehicle fuel pressure booster compression to deliver fuel to the engine of the vehicle.

While in the foregoing specification this invention has been described in relation to certain preferred embodiments thereof, and many details have been set forth for purpose of illustration, it will be apparent to those skilled in the art that the invention is susceptible to additional embodiments and that certain details described herein can be varied considerably without departing from the basic principles of the invention.

We claim:

1. A linear motor compressor comprising:
 a compressor housing;
 a cylinder housing having a plurality of opposing compression chambers;
 a piston freely reciprocating within the cylinder housing, wherein the piston reciprocates without assistance from a mechanical spring;
 a linear electric motor directly coupled to the piston and positioned to reciprocate the piston via a motor electric current powering the motor;
 a flexible coupling between the piston and an armature of the linear electric motor; and
 a piston position feedback control system with adaptive motor current output to directly power and control the linear electric motor and thereby minimize energy required to do work, the piston position feedback control system including a controller in combination with a position feedback system that tracks a position of the piston within the cylindrical housing and wherein the controller adapts or adjusts the motor electric current to the linear electric motor in response to the position of the piston to maintain an optimized piston position and frequency.

2. The linear motor compressor of claim 1 wherein compression is achieved with a single primary moving part.

3. The linear motor compressor of claim 1 wherein the cylinder housing includes the piston freely reciprocating within the cylinder housing, wherein compression discharge from an outlet of a chamber of one side of the opposing compression chambers feeds an inlet of another chamber.

4. The linear motor compressor of claim 1 wherein the piston operates at resonant frequency.

5. The linear motor compressor of claim 1 wherein the plurality of opposing compression chambers comprise a series of stepped diameter compression chambers positioned at opposing ends of the cylinder housing.

6. The linear motor compressor of claim 1, wherein the plurality of opposing compression chambers comprise compression chambers of a single diameter at opposing ends of the cylinder housing.

7. The linear motor compressor of claim 1 wherein the compressor housing is pressurized with a process fluid.

8. The linear motor compressor of claim 1, wherein the compressor housing comprises a blowdown volume for depressurizing the compressor and related systems.

9. The linear motor compressor of claim 8, wherein the cylinder housing includes the piston freely reciprocating within the cylinder housing, wherein compression discharge from an outlet of a chamber of one of the opposing compression chambers feeds an inlet of another chamber and a first stage of compression is drawn from the blowdown volume.

10. The linear motor compressor of claim 1 wherein a process fluid is hermetically sealed within the linear motor compressor.

11. The linear motor compressor of claim 1 further comprising at least one of a rigid piston and a flexible coupling between the piston and an armature of the linear electric motor.

12. The linear motor compressor of claim 1 wherein the linear electric motor comprises a reluctance motor with dual opposing winding cores.

13. The linear motor compressor of claim 1 wherein the linear electric motor comprises one of a permanent magnet motor, an induction motor, a voice coil motor, a reluctance motor, or a homopolar induction motor.

14. The linear motor compressor of claim 1 further comprising integrated motor and process fluid cooling for heat removal.

15. The linear motor compressor of claim 1 wherein the piston position feedback control system comprises a linear encoder feedback loop to track a position of the linear electric motor or the piston.

16. The linear motor compressor of claim 1 further comprising a low friction coating in combination with a seal material optimized for a process fluid to reduce energy consumption and increase seal life.

17. The linear motor compressor of claim 1 further comprising at least one fully integrated motor stator.

18. The linear motor compressor of claim 1 wherein the flexible coupling allows for independent alignment of the piston and the armature.

19. A linear motor compressor assembly comprising:
a compressor housing;
a multi-stage cylinder housing having a plurality of opposing compression chambers;
a piston bi-directionally driven and freely reciprocating within the multi-stage cylinder housing without the assistance from a mechanical spring;
a linear electric motor positioned to reciprocate the piston, wherein the linear electric motor includes an armature and the assembly is hermetically sealed;
a flexible coupling between the piston and the armature of the linear electric motor; and
a piston position feedback control system adapted to track a position of the piston and adjust the current to the linear electric motor up or down in response to the tracked position of the piston in order to directly control and maintain an optimized frequency of the linear electric motor or the piston.

20. The linear motor compressor of claim 19 wherein the flexible coupling allows for independent alignment of the piston and the armature.

21. A gas compression station comprising:
a compressor housing;
a multi-stage cylinder housing having a plurality of opposing compression chambers;
a bi-directional piston reciprocating within the multi-stage cylinder housing without a mechanical spring;
a linear electric motor positioned to reciprocate the piston, the linear electric motor including an armature directly coupled to the piston by a flexible coupling, wherein the compressor chambers and the linear electric motor are hermetically sealed within the compressor housing;
an outlet for discharging a fluid from a final stage of compression; and
a piston position feedback control system with adaptive current output to minimize energy required to do work, wherein the piston position feedback control system comprises a linear encoder feedback loop to track a position of the linear electric motor or the piston, and the piston position feedback control system adjusts the current to the linear electric motor up or down as a function of the position of the linear electric motor or the piston in order to directly control and maintain an optimized frequency of the piston.

22. The linear motor compressor of claim 19 wherein the piston position feedback control system tracks a position of the piston through active inductance measurements.

* * * * *